United States Patent [19]

Bräuninger et al.

[11] Patent Number: 4,808,920
[45] Date of Patent: Feb. 28, 1989

[54] METHOD FOR MONITORING A TACHOMETER SIGNAL

[75] Inventors: Jürgen Bräuninger; James Holmes, both of Stuttgart; Albrecht Sieber, Ludwigsburg, all of Fed. Rep. of Germany

[73] Assignee: Robert Bosch GmbH, Stuttgart, Fed. Rep. of Germany

[21] Appl. No.: 10,139

[22] PCT Filed: Mar. 14, 1986

[86] PCT No.: PCT/DE86/00108

§ 371 Date: Dec. 5, 1986

§ 102(e) Date: Dec. 5, 1986

[87] PCT Pub. No.: WO86/06172

PCT Pub. Date: Oct. 23, 1986

[30] Foreign Application Priority Data

Apr. 18, 1985 [DE] Fed. Rep. of Germany ....... 3513937

[51] Int. Cl.$^4$ .................................................. G01P 3/56
[52] U.S. Cl. ...................................... 324/161; 73/518; 324/163; 324/166
[58] Field of Search ............... 324/161, 163, 160, 166; 73/518, 488

[56] References Cited

U.S. PATENT DOCUMENTS

| | | | |
|---|---|---|---|
| 3,803,425 | 4/1974 | Carp | 324/161 X |
| 4,153,874 | 5/1979 | Kaestner | 324/161 |
| 4,170,274 | 10/1979 | Collonia | 324/161 X |
| 4,355,279 | 10/1982 | Younge | 324/161 |
| 4,575,664 | 3/1986 | Johnson | 324/161 X |
| 4,575,677 | 3/1986 | Dennis | 324/161 |
| 4,629,980 | 12/1986 | Overby | 324/166 |
| 4,670,852 | 6/1987 | Masaki et al. | 324/161 X |

Primary Examiner—Reinhard J. Eisenzopf
Assistant Examiner—Robert W. Mueller
Attorney, Agent, or Firm—Michael J. Striker

[57] ABSTRACT

A method for monitoring of a tachometer signal is suggested, wherein the tachometer output signal is not only monitored with respect to its presence, but in addition also with respect to its plausibility. One exemplified embodiment may be realized with the assistance of a correspondingly programmed computer, wherein the tachometer signal change is checked to determine whether it is within predetermined limits. Furthermore, a possibility of reciprocating switching between erroneous and non-erroneous speed signals is eliminated.

6 Claims, 1 Drawing Sheet

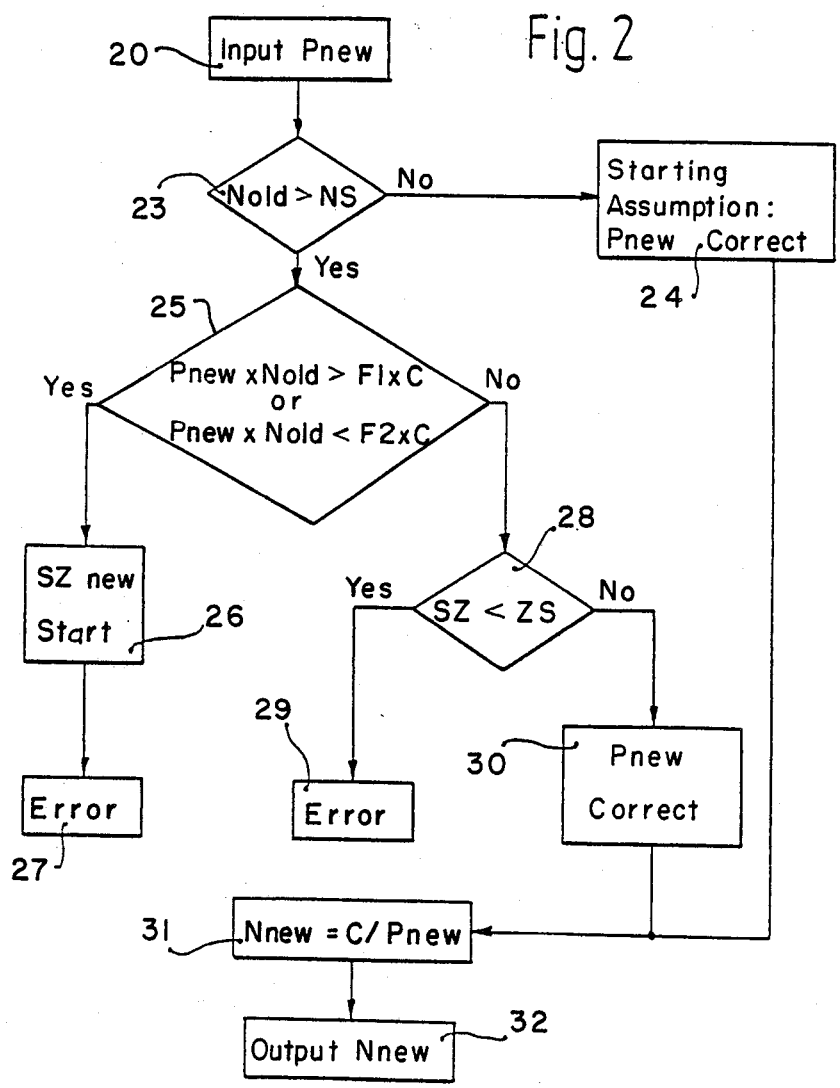

METHOD FOR MONITORING A TACHOMETER SIGNAL

BACKGROUND OF THE INVENTION

One of the most important operating characteristic values for controlling and/or regulating an internal combustion engine is the speed of the internal combustion engine. The speed value is picked up by means of corresponding transmitters and, if need be, prepared for the further processing by means of signal adaptation and amplifications. It is known to monitor the tachometer to determine whether it delivers an output signal or not. If an output signal is present it is used for the control and/or regulation, while a non-present output signal of the tachometer triggers corresponding erroneous functions.

It is now possible that the tachometer delivers an output signal, but that the same does not have any meaningful value. Such meaningless speed signals may be generated by electromagnetic stray effects, by defects of the tachometer, or by mechanical defects of for example, the rotating part of the internal combustion engine which is in operating connection with the tachometer. The disadvantage of the known monitoring devices of tachometer signals consists in that they do not recognize such meaningless signals as being erroneous, but feed them for further processing as correct speed signals. Therefore, in the known systems no plausibility monitoring of the tachometer signals is performed.

SUMMARY OF THE INVENTION

It is an object of this invention to provide a method for monitoring a tachometer signal in which meaningless signals are recognized and only the actual correct tachometer output signals are fed for further processing. In the method in accordance with the invention a plausibility monitoring of the tachometer signals is performed.

In accordance with a particular further embodiment of the invention this object is attained in that for each new tachometer output signal limit values are advanced which at least are dependent from the last tachometer output signal. If the new tachometer signal exceeds these limit values or falls below the same, the monitoring recognizes this tachometer signal as being not meaningful. However, if the new tachometer signal is within the preestablished limits, such a speed signal is then fed for further processing.

In a further advantageous design of the invention a marker is set for each recognized meaningless speed signal, which results in that a speed signal which had been recognized to be correct is only fed for further processing when this marker had been available for a defined preestablished duration of time. Therefore, with the assistance of this marker is is possible to prevent a continuous and rapid reciprocating switching between meaningless and correct speed signals and thereby between a normal operation and erroneous functions.

Finally, it is also possible to perform the monitoring of the tachometer signal if this signal has exceeded a preestablished value. This is advantageous in that interferences may be eliminated which may be generated during the start of the internal combustion engine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 illustrates a block circuit diagram of the device in accordance with the invention;

FIG. 2 illustrates a flow chart diagram of the method in accordance with the invention.

DETAILED DESCRIPTION OF THE PREFERRED EMBODIMENT

The subsequently described exemplified embodiment relates to monitoring of the output signal of a tachometer. Principally it is also possible with the assistance of the method in accordance with the invention to monitor given signals, the changes of which are performed within known limits. The described exemplified embodiment may be realized in different ways and manners, for example, with the assistance of a correspondingly programmed electronic computer, by means of other electronic digital circuits or also with the asssistance of analogous circuits.

In FIG. 1, a tachometer 10, a signal adjustment device 11, and a signal monitoring device 12 which are switched in series form an electric circuit. Thereby, the input signal of the signal monitoring device 12 is a time value Pnew, while the output signal is a new speed value Nnew. For example, the output signal of the tachometer 10 has the form of a series of pulses, whose frequency is proportional to the speed. With the assistance of the signal adjustment device 11 the time between the individual pulses is measured and is again issued as a time value Pnew. Therefore, the signal Pnew has a meaning of a time duration which is proportionally reversed with respect to the speed of the internal combustion engine. The signal monitoring device 12 then generates from the time value Pnew the new speed value Nnew by means of defined computing operations, which then is made available in a given manner, for example, analogous, digital, etc. In principle, in particular in an error free operating tachometer, each time value Pnew consequently generates a new speed value Nnew.

FIG. 2 illustrates the operating sequence of the method in accordance with the invention for monitoring a tachometer signal. This operating sequence is realized by the signal monitoring device 12 of FIG. 1 in form of a corresponding program sequence for an electronically programmable computer.

A block 20 of FIG. 2 symbolizes the input of the time value Pnew in the signal monitoring 12 of FIG. 1 and thereby the start of the monitoring and checking of this input time value Pnew.

If a time value Pnew is present it is checked in the subsequent block, whether the latest computed speed value Nold is greater than a predetermined speed threshold value NS. With the assistance of this speed threshold value NS it is possible to eliminate interferences which may be generated during the start. If therefore the last computed old speed value Nold is smaller than the speed threshold NS, the mentioned starting case is present and it is assumed according to a block 24 that the newly fed time value Pnew is correct. Therefore, in this starting case no plausibilty control is performed for the time value, but this value Pnew is directly forwarded.

If no starting case is present, the old speed value Nold is greater than the speed threshold NS, the monitoring with block 25 is continued. The actual plausibility control is performed in this block 25. For this purpose the new time value Pnew is compared with a corresponding evaluated time value Pold. As will be explained later, a new speed value Nnew is obtained by the division of a constant C by the new time value Pnew. This simultaneously means that the old value Pold may be illustrated by the division of constant C of the old speed value Nold. If one uses this interrelationship when examining the new time value Pnew with the already mentioned limits, the following result will be obtained:

F2×Pold<Pnew<F1×Pold or with Pold=C/Nold:

F2×C<Pnew×Nold<F1×C

The values F1 and F2 are factors which are normally constant, but under certain circumstances may also be variable, however in each case the factor F1 is greater than 1 and the factor F2 is smaller. Thus, with the assistance of factor F2 an upper limit of the time value Pnew is fixed, as well as a lower limit with the assistance of factor F1.

If the time value Pnew is outside of the predetermined limits, which is determined with the assistance of the above mentioned equations, a locking count SZ is started anew in the subsequent block 26, so as to trigger corresponding erroneous functions and/or indications with the assistance of block 27. However, if the time value Pnew is within the predetermined limits set forth by factors F1 and F2, the sequence of the inventive monitoring is continued with block 28.

As had been stated, in the case wherein the time value Pnew is outside of the predetermined limits set in block 25, the locking count SZ is started anew by means of block 26. This locking count SZ is checked in block 28 to determine whether or not it exceeded a predeterminable counting threshold ZS. If the value of the locking count SZ is smaller than the threshold ZS an erroneous reaction is triggered with the assistance of a block 29 analogous to block 27. If, however, the locking count SZ has a greater value than the count threshold ZS, consequently the time value Pnew is recognized as correct one in a block 30.

Therefore, in the hitherto described method there are two possibilities in which the time value Pnew may be recognized as being correct, namely in the case of a start (block 24) and when the time value Pnew is within predetermined limits (block 25), and simultaneously when the locking count SZ has a greater value than the count threshold ZS (block 28). For this reason, blocks 24 and 30 are connected with a further block 31 in the two latter mentioned cases, with the aid of which the new speed value Nnew is calculated from the correct time value Pnew. This is obtained by the division of the already mentioned constant C by the time value Pnew. Thereby, the constant C is dependent from the given transmitter device.

Finally, block 32 issues the new speed value Nnew and may therefore form the output signal of the signal monitoring device 12 of FIG. 1, for example. During the next throughput of the total described monitoring this new speed value Nnew then forms the old speed value Nold.

Principally, it is also possible to operate the total method without the locking count. The specific advantage of the locking count resides in that periodically short time generated errors do not result in a reciprocating switching between an emergency function or erroneous function and the normal functions. Thereby, it is to be noted that the locking count is incremented either in a fixed time cycle or always when a new time value Pnew is generated. With the assistance of the count threshold ZS a new time value Pnew is only recognized again as being correct, if a defined time duration has passed.

It is also possible to start a time delay initially in addition to the described particular treatment in the case of starting, in particular after exceeding the old speed value Nold beyond the speed threshold NS, and to perform the actual plausibility monitoring only after the performance of this time delay. Thereby, it is possible to safely eliminate interferences which under certain circumstances may occur during starting.

A further advantageous embodiment of the invention resides in that in the case wherein within a time duration Q, which is longer than the last measured old time value Pold, no new time value Pnew is present, because the time between the individual pulses has increased for scanning the value Q for the purpose of monitoring Pnew as a new time value. However, in this case block 31 should not be used after a monitoring, because no new speed value Nnew should be formed in dependency from the predetermined value Q. This new speed value Nnew can only be formed again in the described further embodiment if indeed a new time value Pnew is present.

The particular advantage of the method in accordance with the method in accordance with the invention for monitoring a tachometer output signal resides in particular in that the total monitoring is performed by means of a minimal of computing expenses, in particular only one single multiplication is required, namely Pnew×Nold, and that only minimal storage expenses is required, namely only for the locking count SZ. The products F1×C and F2×C are constants which do not change and therefore may be predetermined only once, while the two variable values Pnew and Nnew or Nold are values which in each case must be intermediately stored.

We claim:

1. A method for monitoring a tachometer signal by means of a tachometer generating a succession of tachometer signals and a device for monitoring tachometer signals connected to said tachometer, the method comprising the steps of determining an upper and a lower threshold values for each tachometer signal generated by the tachometer, said upper and lower threshold values being formed in each case in dependence upon a computed preceding tachometer signal, and comparing a new generated tachometer signal with said upper and lower threshold values, whereby if said new generated tachometer signal exceeds said upper threshold value or falls below said lower threshold value an erroneous reaction is released on said monitoring device.

2. Method in accordance with claim 1, wherein a marker is newly set after each exceeding of the threshold value.

3. Method in accordance with claim 2, wherein the erroneous reaction is released as long as the marker has not exceeded a predetermined time limit.

4. Method in accordance with claim 3, wherein each new tachometer signal in said succession is only monitored if the preceding tachometer signal is greater than a predetermined value.

5. Method in accordance with claim 4, wherein each new tachometer signal in said succession is further used if the monitoring does not release the erroneous reaction.

6. Method in accordance with claim 5, wherein the tachometer signal of an internal combustion engine is monitored.

* * * * *